No. 887,694.
PATENTED MAY 12, 1908.
T. W. ROACH.
DEVICE FOR DRESSING SAWS.
APPLICATION FILED AUG. 10, 1907.
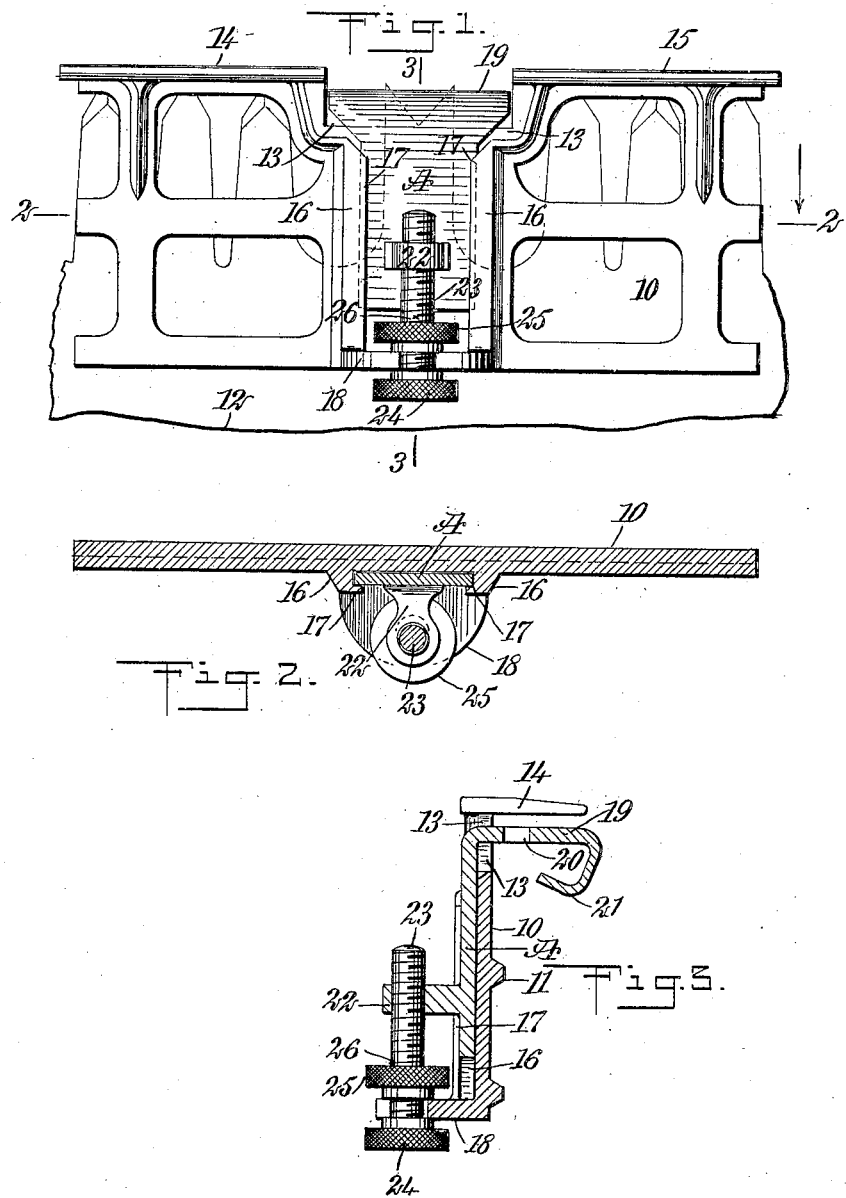
WITNESSES
INVENTOR
Thomas Wiley Roach
BY
ATTORNEYS

UNITED STATES PATENT OFFICE.

THOMAS WILEY ROACH, OF LYMAN, WASHINGTON.

DEVICE FOR DRESSING SAWS.

No. 887,694. Specification of Letters Patent. Patented May 12, 1908.

Application filed August 10, 1907. Serial No. 388,010.

*To all whom it may concern:*

Be it known that I, THOMAS WILEY ROACH, a citizen of the United States, and a resident of Lyman, in the county of Skagit and State of Washington, have invented a new and useful Improvement in Devices for Dressing Saws, of which the following is a full, clear, and exact description.

The purpose of the invention is to improve upon the construction for which Letters Patent were granted to me April 17, 1906, Serial No. 818,195, to the extent that the device is rendered more simple and will be more accurate under long usage, since the improved adjusting device may be used indefinitely without loss of action.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the device in use with parts broken away; Fig. 2 is a horizontal view looking down and taken on the line 2—2 of Fig. 1; and Fig. 3 is a vertical section taken practically on the line 3—3 of Fig. 1.

The body 10 is preferably of skeleton formation and is provided with horizontal ribs 11 adapted to engage the saw 12. The body is provided with an opening 13 in its upper edge, and two over-hanging shelves 14 and 15, one at each side of the said opening, adapted to engage the cutting edges of the saw tooth when being acted upon. Below the opening 13 adjacent its side edges parallel transverse ribs 16 are formed, having inwardly extending continuous dovetail edged, flanges 17, that constitute guideways for a slide A, and at the bottom edge of the body a horizontal forked ledge 18 is formed, that extends from one rib 16 to the other. The slide A is shorter than the width of the body, as is shown in Figs. 1 and 2, and is widened at its upper edge, where it is provided with a lateral or horizontally turned extension 19, that is carried out through the opening 13 of the body in the same direction as the shelves 14 and 15.

The extension 19 forms a table in which an opening 20 is produced, to receive the points of the drag teeth of the saw to be operated upon. The extension 19 is turned downward or forward at its end to form a hook 21 adapted to receive a file for use in jointing or truing the teeth of the saw. A lug 22 is carried horizontally out from the slide A, which lug is provided with a threaded aperture that receives the upper end of a screw 23, and the said screw 23 is likewise passed through the bifurcated portion of the forked ledge 18, and the head 24 of the screw is located beneath said ledge. This screw is adapted for use in raising and lowering the slide A according to the length of the raker tooth required, and the slide is held in adjusted position by means of a lock nut 25, that is located on the said screw, and in adjustment the lock nut is carried down to an engagement with the upper face of the forked ledge 18.

In order that the adjusting device, namely the screw and the lock nut, may not be tampered with, the screw 23 is provided with an indentation 26 in one of its threads, at a point above the lock nut 25, which prevents the lock nut from being carried too far up along the screw but yet admits of ample adjustment of the slide.

In the use of the invention for swaging a drag tooth, the parts are adjusted as has been described, and the points of the drag teeth are made to project above the slide for the distance which said teeth are to be swaged. This having been done a suitable instrument is placed against the inner or adjacent faces of the points of the drag tooth, and said instrument is struck with a hammer or the like, swaging down the points of the teeth.

Having thus described my invention I claim as new and desire to secure by Letters Patent,—

A saw swaging device, comprising a body having an overhanging shelf provided with an opening, parallel ribs located on the body below the opening, each rib being provided with an inwardly extending flange forming guideways, said body being also provided with a forked ledge at its lower edge, a slide mounted in the guide-ways and having a table adapted to lie in the opening of the shelf, an adjusting screw passed through the forked ledge and threaded into the slide, and a locking nut located on the screw and adapted for engagement with the ledge, whereby to fix said slide with respect to the shelf.

In testimony whereof I have signed my name to this specification in the presence of two subscribing witnesses.

THOMAS WILEY ROACH.

Witnesses:
B. A. TYLER,
CHAS. M. MARTIN.